Patented Dec. 31, 1940

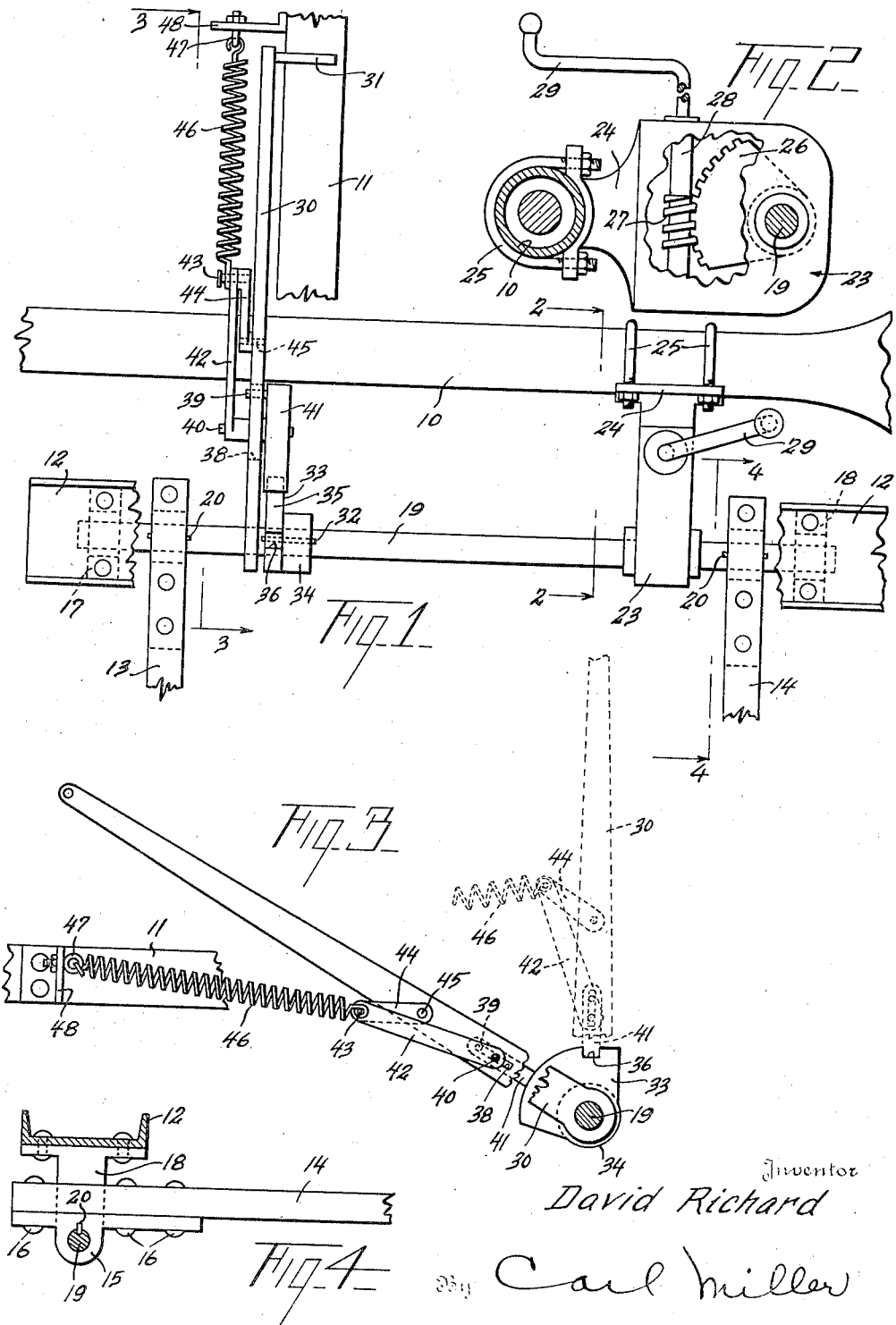

2,226,637

UNITED STATES PATENT OFFICE 2,226,637

LIFTING DEVICE

David Richard, Lennox, S. Dak.

Application January 2, 1940, Serial No. 312,032

5 Claims. (Cl. 97—243)

This invention relates to a semi-automatic hand lift for tractors to be used in the act of cultivating plants such as corn and more particularly to novel means through the medium of which the shields or plows of such cultivator may be raised or lowered, with relation to the ground, as the height of the plants may require.

The invention has for one of its objects to provide semi-automatic means of the character stated which shall be adapted to be readily applied to a tractor and to the cultivator implements, through the medium of which said implements may be raised or lowered, and which shall be adapted to be conveniently controlled by the operator of the tractor from his seat and without stopping the tractor.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is a plan view of the semi-automatic hand lift attached to a tractor only such parts of the tractor being shown as related to the handlift;

Figure 2 is a sectional view with parts broken away taken on line 2—2, Figure 1, showing worm gear lift;

Figure 3 is a detail view taken on line 3—3, Figure 1, showing automatic clevis and lever operating mechanism;

Figure 4 is a detail sectional view taken on line 4—4, Figure 1, showing pivotal mounting of one of the cultivator carrying arms.

Referring in detail to the drawing, 10 denotes the rear axle of a tractor, 11 is a longitudinal frame member and 12 a transverse cross-member of channel form. The cultivator implements such as the shields or plows (not shown) are suitably supported by a pair of rearwardly extending cultivator carrying arms 13—14, each being provided at its forward end with a hub 15 secured to the underside of the arm as by rivets 16, see Figure 4.

Fixed to the underside of the channel cross-member 12 are a pair of laterally spaced depending brackets 17—18, each of which rotatably supports an end of a shaft 19. Mounted on the shaft 19 and adjacent to each bracket is the hub 15 of a cultivator carrying arm, each hub being non-rotatably secured to the shaft as by means of a key 20. Thus, a rotation or turning movement applied to the shaft 19 as will be hereinafter described will raise or lower the cultivator carrying arms 13—14.

The hand-lift attachment forming part of the instant invention comprises a worm and sector gear casing 23 formed with an integral clamping seat 24 adapted to abut one side of the tractor axle housing 10 and which is rigidly secured thereto as by the U-bolts 25. The casing 23 is so formed and dimensioned as to rotatably support an intermediate portion of the shaft 19 which, see Figures 1 and 2, extends transversely therethrough. Within the casing 23 is a sector gear 26 fixedly mounted on the shaft 19 and adapted to mesh with a worm 27 disposed in a vertical portion and being suitably supported in bearings not shown. Attached to the shaft 28 of the worm 27 is a hand crank 29 which along with the casing 23 is so positioned with reference to the tractor axle and frame as to be within easy access of the operator of the tractor when in his seat (not shown).

In order to facilitate the raising of the cultivator implements in the hand operation of the worm and sector through the medium of the crank 29, the hand lift attachment includes a semi-automatic lever mechanism associated with the shaft 19. Thus at a suitable point on the shaft 19 opposite to the worm gear casing 23 is mounted for free rotation thereon one end of a lever 30, the other end of which is provided with a handle 31. Adjacent the lever 30 and fixedly attached to the shaft 19 as by the key 32 is a sector block 33 comprising a hub 34 and an edge face 35 constituting an arc of a circle, having formed therein adjacent the forward end thereof a notch 36.

The lever 30 is provided just above the edge face 35 of the sector block with a guide slot 38, which is adapted to receive an upper guide pin 39 and pivot pin 40, of a latch bolt 41 disposed adjacent to the inside face of the lever 30, said pins being rigid with said latch bolt and with the pivot pin 40 projecting outwardly beyond the outside face of the lever 30, for a substantial distance for a purpose to be hereinafter described. The slot and latch bolt are so dimensioned with reference to the sector block 33 that when the latch bolt 41 is raised with reference to the lever 30 the bottom end of the latch bolt 41 will ride on the edge face 35 of the sector block, as shown in Figure 3. Pivotally carried by the extended portion of the pivot pin 40 is one end of a link 42, the other end of which is pivotally connected to a pin as at 43 to one end of a link 44. The other end of the link 44 is pivotally mounted on the pin 45 secured to the lever 30 a predetermined distance above the upper end of the slot 38 and preferably in alignment therewith. A tension coil spring 46 is connected at one end to the pin 43 connecting the links 42 and 43, the other end of the coil spring 46 being secured to an adjustable eye bolt 47 carried by a bracket secured at a forward point to the longitudinal frame member 11.

The semi-automatic hand lift operates as follows: When the operator desires to raise the cultivator implements he pulls the lever 30 up to a vertical position, see dotted lines Figure 3, whereby under the action of the links 44 and 42 and spring 46 the latch bolt is moved down into the notch 36 of the sector block 33 so as to lock the lever 30 to the sector block 33 and shaft 19. As will be apparent the spring 46 is stressed so as to exert a pulling force on the lever 30 tending to move the same in a counterclockwise direction, see Figure 3. The operator then by turning the crank 29 to operate the sector gear will cause a rotation of the shaft 19 to swing the cultivator carrying arms upwardly, the load of the same plus that of the cultivator implements being counterbalanced by the action of the spring 46 to effect a quick and effortless raising of said parts. When the lever 30 is returned by the above raising movement to the solid line position, see Figure 3, the pull of the spring 46 and the action of the links 42, 44 will be such as to cause the link 42 to pull the latch bolt 41 out of the notch 36 so as to release the lever 30 from the sector block. A lowering of the cultivator arms is thus effected by a reverse rotation of the crank 29.

Having thus described my invention, I claim as new and desire to secure by Letters Patent:

1. A semi-automatic hand lifting device for use with a tractor attached plant cultivator mechanism including a shaft mounted on the tractor frame and a pair of carrying arms supporting said cultivator mechanism fixedly attached to said shaft, comprising manual operative means mounted on the tractor and connected to said shaft for turning the same to effect a raising or lowering of said cultivator mechanism, and resilient means providing a counterbalancing action connected to said shaft and operative to assist in the raising of said cultivator mechanism, said resilient means including a manual controlled lever and link assembly for operatively connecting said resilient means to said shaft to effect said counterbalancing action, said lever and said manual operative means being so positioned as to be accessible from the tractor operator's seat.

2. A semi-automatic hand lifting device for use with a tractor attached plant cultivator mechanism including a shaft mounted on the tractor frame and a pair of carrying arms supporting said cultivator mechanism fixedly attached to said shaft, comprising manual operative means mounted on the tractor and connected to said shaft for turning the same to effect a raising or lowering of said cultivator mechanism, and a manual controlled lever and link assembly including spring means connected to said shaft and operative to provide a counterbalancing action to assist in the raising of said cultivator mechanism and being adapted to be automatically rendered inoperative upon the completion of said raising movement and to remain inoperative during the lowering of said cultivator mechanism.

3. A semi-automatic hand lifting device for use with a tractor attached plant cultivator mechanism including a shaft mounted on the tractor frame and a pair of carrying arms supporting said cultivator mechanism fixedly attached to said shaft, comprising a crank operated worm and sector gear unit mounted on the tractor and connected to the shaft for turning the same to effect a raising or lowering of said cultivator mechanism, and a lever operated spring counterbalancing mechanism connected to said shaft operative to assist in said raising movement and being adapted to be automatically rendered inoperative during said lowering movement, both said crank and lever being so positioned as to be readily accessible from the tractor operator's seat.

4. A semi-automatic hand lifting device for use with a tractor attached plant cultivator mechanism including a shaft mounted on the tractor frame and a pair of carrying arms supporting said cultivator mechanism fixedly attached to said shaft, comprising manual operative means mounted on the tractor and connected to said shaft for turning the same to effect a raising or lowering of said cultivator mechanism, and a manual controlled lever and link assembly including spring means connected to said shaft and operative to provide a counterbalancing action to assist in the raising of said cultivator mechanism and being adapted to be automatically rendered inoperative upon the completion of said raising movement and to remain inoperative during the lowering of said cultivator mechanism, said manual controlled lever and link assembly comprising a sector block rigid with said shaft, a lever rotatably mounted on said shaft adjacent to said sector block, a latch bolt mounted on said lever for bodily guided movement thereon towards and away from said sector block and in the plane thereof, a pair of links pivotally connected together at one end, the other end of one link being pivotally connected to said lever and the other end of the other link being pivotally connected to said latch bolt, a coil spring connected at one end to said tractor and at its other end to the common pivotal connection of said links, said sector block having a notch provided therein to seat said latch bolt, said parts being so dimensioned and co-related that with said cultivator in its lowered position and upon a predetermined movement of said lever said links under the action of said spring will cause said latch bolt to move into seating engagement with the notch in said sector block so as to lock said lever and link assembly to said shaft whereby said spring will react on said lever in a direction tending to turn said shaft to raise said cultivator mechanism to provide said counterbalancing action.

5. In the device as set forth in claim 4, wherein upon the completion of said raising movement said links under the action of said spring will act to raise said latch bolt to effect said counterbalancing action inoperative.

DAVID RICHARD.